(12) United States Patent  
Lin et al.

(10) Patent No.: US 10,956,171 B2  
(45) Date of Patent: Mar. 23, 2021

(54) VIRTUAL REALITY DEVICE AND METHOD FOR CONFIGURING THE SAME

(71) Applicants: Beijing BOE Optoelectronics Technology Co., Ltd., Beijing (CN); BOE Technology Group Co., Ltd., Beijing (CN)

(72) Inventors: Lin Lin, Beijing (CN); Jian Sun, Beijing (CN); Ziqiang Guo, Beijing (CN); Yakun Wang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 32 days.

(21) Appl. No.: 16/121,785

(22) Filed: Sep. 5, 2018

(65) Prior Publication Data

US 2019/0235878 A1 Aug. 1, 2019

(30) Foreign Application Priority Data

Jan. 31, 2018 (CN) .......................... 201810097167.2

(51) Int. Cl.
*G06F 9/4401* (2018.01)
*G06F 9/445* (2018.01)
(Continued)

(52) U.S. Cl.
CPC ......... *G06F 9/4403* (2013.01); *G02B 27/017* (2013.01); *G06F 3/011* (2013.01); *G06F 9/44505* (2013.01); *G06F 9/44578* (2013.01)

(58) Field of Classification Search
CPC ..... G06F 3/011; G06F 3/017; H04N 13/0429; H04N 13/344; H04N 13/189; H04N 13/366
See application file for complete search history.

(56) References Cited

U.S. PATENT DOCUMENTS 5,905,726 A * 5/1999 Gupta ................. H04L 12/5601  
                                                348/E7.071  
8,275,926 B2 * 9/2012 Naso ...................... G06F 13/16  
                                                711/100

(Continued)

FOREIGN PATENT DOCUMENTS

CN         201563179 U      8/2010  
CN         103327281 A      9/2013

(Continued)

OTHER PUBLICATIONS

First Office Action, including Search Report, for Chinese Patent Application No. 201810097167.2, dated Jul. 29, 2020, 17 pages.

*Primary Examiner* — Getente A Yimer  
(74) *Attorney, Agent, or Firm* — Westman, Champlin & Koehler, P.A.

(57) ABSTRACT

The embodiments of the present disclosure disclose a virtual reality device and a method for configuring a virtual reality device. The virtual reality device comprises: at least one switching circuit and a display circuit. Each of the switching circuits comprises a first input port, a second input port, and an output port. The first input port and the second input port are both configured to input signals, respectively, and each of the switching circuits is configured to control an output port of the switching circuit to output a signal corresponding to a first input port or a second input port of the switching circuit to the display circuit.

18 Claims, 6 Drawing Sheets

(51) Int. Cl.
*G06F 3/01* (2006.01)
*G02B 27/01* (2006.01)
*G06F 3/14* (2006.01)
*G09G 5/00* (2006.01)

(56) References Cited

U.S. PATENT DOCUMENTS

| | | | |
|---|---|---|---|
| 9,253,043 B2 * | 2/2016 | Adolphson | H04L 41/0803 |
| 2001/0030969 A1 * | 10/2001 | Donaghey | H04L 45/10 370/397 |
| 2005/0038947 A1 * | 2/2005 | Lueck | G06F 13/4031 710/315 |
| 2007/0250696 A1 | 10/2007 | Ryser | |
| 2014/0146007 A1 | 5/2014 | Lee et al. | |
| 2018/0143681 A1 * | 5/2018 | Myung | G06F 3/04815 |
| 2019/0075288 A1 | 3/2019 | Zhou et al. | |

FOREIGN PATENT DOCUMENTS

| | | |
|---|---|---|
| CN | 103838507 A | 6/2014 |
| CN | 105138774 A | 12/2015 |
| CN | 105915990 A | 8/2016 |
| CN | 205883718 U | 1/2017 |
| CN | 106527687 A | 3/2017 |
| CN | 206270880 U | 6/2017 |

* cited by examiner

VIRTUAL REALITY DEVICE AND METHOD FOR CONFIGURING THE SAME

CROSS-REFERENCE TO RELATED APPLICATION(S)

This application claims priority to the Chinese Patent Application No. CN201810097167.2, filed on Jan. 31, 2018, entitled "VIRTUAL REALITY DEVICE AND METHOD FOR CONFIGURING THE SAME", which is incorporated herein by reference in its entirety.

TECHNICAL FIELD

The present application relates to, but is not limited to, the field of computer technology, and more particularly, to a virtual reality device and a method for configuring the same.

BACKGROUND

With the tremendous increase in computers' computing capabilities and the widespread application of the big data technology, the Virtual Reality (VR for short) technology has been rapidly developed. The virtual reality technology is not only widely used in fields such as defense, aerospace, industrial manufacturing, etc., but also shows its strong entertainment in terms of personal entertainment, etc. VR devices have become an important tool for people's life and entertainment.

Currently, VR devices on the market comprise all-in-one machines and split machines. In order to cater to the development of the market, and take practical use needs of users into account, all-in-one split machines have become a development trend of VR devices. A design idea of the VR all-in-one split machines is to make full use of the high-speed computing capability of computers using a Central Processing Unit (CPU for short) as a core and the mobility of mobile phone motherboard modes using an Application Processor (AP for short) as a core. In practical design, an output terminal may be a display device complying with a Mobile Industry Processor Interface (MIPI for short) Display Serial Interface (DSI for short) (i.e., MIPI DSI interface) protocol, for example, a Liquid Crystal Display (LCD for short), an Organic Light-Emitting Diode (OLED for short) display, etc. The design needs of the VR all-in-one split machines are to achieve switching between two modes, i.e., an all-in-one mode and a split mode, on one device. However, signal switching cannot be realized for a high-speed MIPI DSI signal between the all-in-one mode and the split mode directly through topological wiring.

In summary, in the application needs of the VR devices in the all-in-one mode and the split mode in the related art, there is a problem that signal switching cannot be realized for the high-speed MIPI DSI signal, which thus makes it difficult to integrate an all-in-one machine and a split machine into one device.

SUMMARY

The embodiments of the present disclosure provide a virtual reality device, comprising: at least one switching circuit and a display circuit,
wherein each of the switching circuits comprising a first input port, a second input port, and an output port, wherein the first input port and the second input port are both configured to input signals, respectively, and
each of the switching circuits is configured to control the output port of the switching circuit to output, to the display circuit, a signal corresponding to the first input port or the second input port of the switching circuit.

Optionally, in the virtual reality device described above, the first input port is configured to receive a signal input by an application processor of the virtual reality device; and
the second input port is configured to receive a signal input by an external device.

Optionally, the virtual reality device described above further comprises: compression circuits connected to the second input ports of a part or all of the switching circuits on a one-to-one basis,
wherein an input port of each of the compression circuits is configured to receive the signal input by the external device, and
wherein the second input port of each of the switching circuits is configured to receive a signal input by the external device and compressed by a corresponding compression circuit.

Optionally, in the virtual reality device described above, the compression circuits are built in the application processor of the virtual reality device.

Optionally, in the virtual reality device described above, the external device is connected to the input ports of the compression circuits through a data conversion circuit; and
the data conversion circuit is configured to receive a High Definition Multimedia Interface (HDMI) signal input by the external device, convert the HDMI signal into an input signal, and then transmit the input signal to the compression circuits.

Optionally, in the virtual reality device described above, each of the switching circuits further comprises at least one programmable output port.

Optionally, in the virtual reality device described above, each of the switching circuits is further configured to control a signal in the switching circuit to be output via a corresponding programmable output port.

Optionally, in the virtual reality device described above further comprises:
adaptor circuits connected to all of the first input ports and all of the second input ports on a one-to-one basis.

Optionally, in the virtual reality device described above, the signals are high-speed signals.

The embodiments of the present disclosure further provide a method for configuring the virtual reality device according to claim 1, wherein the method is a method for configuring any virtual reality device described above, and comprises:
performing operational steps of a pre-configured program;
generating an execution file of the program; and
downloading the execution file to each of the switching circuits, and controlling, though the execution file, an output port of a corresponding switching circuit to output, to the display circuit, a signal corresponding to a first input port or a second input port of the switching circuit.

Optionally, in the method described above, before generating an execution file of the program, the method further comprises:
performing a timing simulation on the program; and
verifying a path delay in the virtual reality device according to a result of the timing simulation.

Optionally, in the method described above, before performing operational steps of a pre-configured program, the method further comprises:
simulating the program using the simulation file; and performing operational steps of a pre-configured program comprises:

when it is verified that the simulation is successful, performing the operational steps of the program.

Optionally, in the method described above, before simulating the pre-configured program using the simulation file, the method further comprises:

generating the program, initializing a Display Command Set Read Only Memory (DCS ROM), and configuring an external device of a Display Serial Interface (DSI); and instantiating the generated program, and generating the simulation file for verifying the program.

Optionally, in the method described above, bottom-level files of the program are in a closed state, and the method further comprises:

modifying a part of parameter settings of the virtual reality device by modifying top-level files of the program.

Optionally, in the method described above, each of the switching circuits further comprises at least one programmable output port, and the method further comprises:

outputting a signal in a corresponding switching circuit from the programmable output port by modifying a mapping file of the program.

Optionally, in the method described above, the signal is a high-speed signal.

Optionally, in the method described above, the signal corresponding to the first input port is a signal input by an application processor of the virtual reality device.

Optionally, in the method described above, the signal corresponding to the second input port is a signal input by an external device.

Optionally, in the method described above, the signal corresponding to the second input port is a signal input by the external device and compressed by a corresponding compression circuit.

Optionally, in the method described above, the signal corresponding to the second input port is a signal input by the external device, converted by a data conversion circuit, and compressed by a corresponding compression circuit.

BRIEF DESCRIPTION OF THE DRAWINGS

The accompanying drawings are used to provide a further understanding of the technical solutions of the present disclosure, and constitute a part of the specification. The accompanying drawings are used to explain the technical solutions of the present disclosure together with the embodiments of the present application, and do not constitute a limitation of the technical solutions of the present disclosure.

DETAILED DESCRIPTION

In order to make the purposes, technical solutions and advantages of the present disclosure more clear and apparent, the embodiments of the present disclosure will be described in detail below with reference to the accompanying drawings. It should be illustrated that, the embodiments in the present application and features in the embodiments can be combined with each other randomly without a conflict.

The present disclosure provides the following specific embodiments which can be combined with each other, and the same or similar concepts or processes may not be described again in some embodiments.

Figure 1:
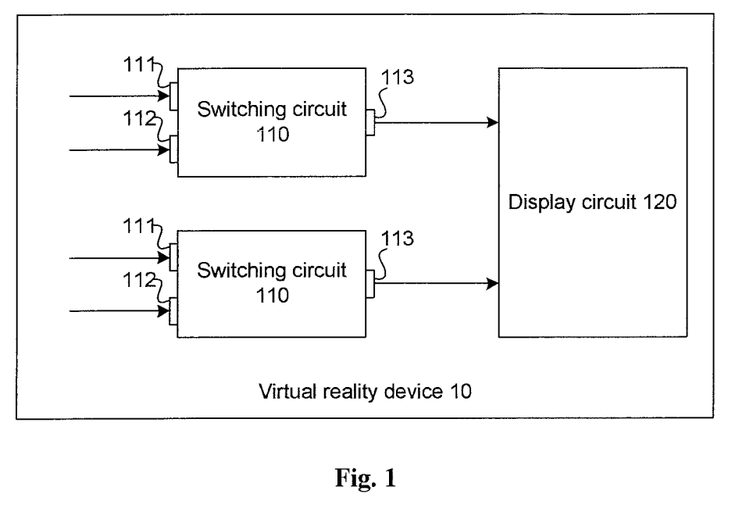
FIG. 1 is an exemplary hardware structural diagram of a virtual reality device according to an embodiment of the present disclosure.

FIG. 1 is an exemplary hardware structural diagram of a virtual reality device 10 according to an embodiment of the present disclosure. The virtual reality device 10 according to the embodiment of the present disclosure may comprise at least one switching circuit 110 and a display circuit 120.

Here, each of the switching circuits 110 comprises a first input port 111, a second input port 112, and an output port 113. Here, the first input port 111 and the second input port 112 are both configured to input high-speed signals, respectively. The embodiment of the present disclosure is described by taking the high-speed signal being an MIPI DSI signal as an example, wherein the MIPI DSI signal is a high-speed signal which conforms to an MIPI standard and is transmitted through a DSI interface, but the present disclosure is not limited thereto. For example, in some embodiments, the signal involved may be a non-high-speed signal, such as a low-speed serial signal etc. In addition, in some other embodiments, other parallel or serial signals at other rates may also be used.

Each of the switching circuits 110 is configured to control an output port 113 of the switching circuit 110 to output a high-speed signal corresponding to a first input port 111 or a second input port 112 of the switching circuit 110 to the display circuit 120.

The virtual reality device 10 according to the embodiment of the present disclosure may be, for example, a virtual reality helmet, and the display circuit 120 of the virtual reality device 10 is display panels of the virtual reality helmet. When a user wears the virtual reality helmet, a video which is vivid and has high authenticity may be seen by the user through left and right display panels. Generally, an input of the VR device may be input through an AP of the VR device, and at this time, the VR device is an all-in-one machine. Further, the input of the VR device may also be input through a Personal Computer (PC for short), and at this time, the VR device is a split machine.

In the embodiment of the present disclosure, the virtual reality device 10 receives the input high-speed signal through the switching circuit 110, and the switching circuit 110 may input two high-speed signals through the first input port 111 and the second input port 112, and output one of the high-speed signals to the display circuit 120, wherein the two high-speed signals input to each switching circuit 110 are both MIPI DSI signals. In the embodiment of the present disclosure, the switching circuit 110 has a function of controlling the output port of the switching circuit 110 to selectively output a high-speed signal corresponding to one of the input ports, i.e., implementing an either-or output function.

It should be illustrated that, in the embodiment of the present disclosure, a number of the switching circuits 110 is not limited, and there may be one or two switching circuits 110. Further, more switching circuits 110 may be constructed according to the speed requirements of the MIPI DSI signal, and the virtual reality device 10 shown in FIG. 1 is illustrated by providing two switching circuits 110 as an example, but the present disclosure is not limited thereto.

In the embodiment of the present disclosure, the display circuit 120 may perform display according to the high-speed signal output by each switching circuit 110. It should be illustrated that, in some embodiments, the display circuit 120 may display high-speed signals corresponding to only one type of input ports at the same time, that is, the signals received at the same time are high-speed signals corresponding to first input ports 111 of all the switching circuits 110, or signals corresponding to second input ports 112 of all the switching circuits 110. Therefore, if a plurality of switching circuits 110 are provided in the virtual reality device 10, all the switching circuits 110 control the high-speed signals output by the output ports 113 thereof to be the high-speed signals corresponding to the first input ports 111 or the high-speed signals corresponding to the second input ports 112 at the same time. In practical applications, the first input ports 111 correspond to one input form, such as AP input, and the second input ports 112 correspond to another input form, such as PC input.

However, the present disclosure is not limited thereto, and in some other embodiments, signals input by different input ports 111 or 112 of different switching circuits 110 may be used at the same time. For example, in some embodiments, a first PC input signal from a first input port 111 of one switching circuit 110 may be used while using a second PC input signal from a second input port 112 of another switching circuit 110, thereby distributing the computational load across multiple PCs to improve the processing efficiency and quality.

Figure 2:
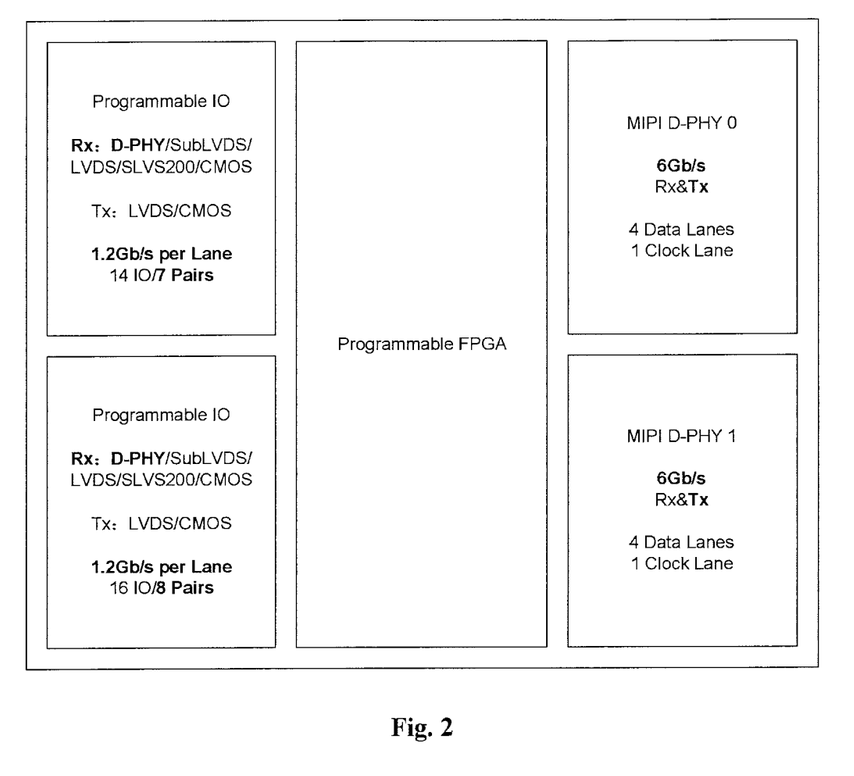
FIG. 2 is an exemplary functional structural diagram of an Application Specific Standard Parts (ASSP) device implementing a switching circuit according to an embodiment of the present disclosure.

In practical applications, in the embodiment of the present disclosure, an Integrated Circuit (IC for short) chip may be selected as the switching circuit 110, so that switching is performed between two high-speed signals through the IC chip. In some embodiments, the selected IC chip may be a typical Application Specific Standard Parts (ASSP for short) device having 15 pairs of user-configurable Input/Outputs (IOs for short) with a maximum rate of 1.2 Gb/s per Lane, and two built-in standard 4-Lane MIPI protocol Defined on a PHYsical layers (MIPI D-PHYs) to achieve 6 Gb/s high-speed data transmission. FIG. 2 illustrates an exemplary functional structural diagram of an ASSP device implementing a switching circuit according to an embodiment of the present disclosure. As shown in FIG. 2, an IO on the left side, i.e., an input terminal, is used for a Rx signal, and an IO on the right side, i.e., an output terminal, is used for a Tx signal. Therefore, a maximum received data rate is 14.4 Gb/s, wherein 12 pairs of I/Os are used to input high-speed signals, and 3 pairs of I/Os are used to input control signals, and a maximum transmitted data rate is 12 Gb/s. However, the present disclosure is not limited to the IC chip design shown in FIG. 2.

As shown in FIG. 2, a basic performance of the ASSP device used to implement the switching circuit is briefly introduced. The ASSP device has characteristics of a Field Programmable Gate Array (FPGA for short), and all pins are bidirectional input/outputs. As a pin Rx on the left side of FIG. 2 supports D-PHY, wherein, in the MIPI protocol, D-PHY provides definitions of a Display Serial Interface (DSI for short) and a Camera Serial Interface (CSI for short) on a physical layer, in the embodiment of the present disclosure, the pin on the left side is taken as an input terminal, which receives MIPI signals transmitted by an AP and a PC. The fifteen pairs of pins correspond to three MIPI ports (3-Ports), and each of the MIPI DSI signals comprises four pairs of data lanes (corresponding to four pairs of IOs) and one pair of control clocks. Therefore, twelve pairs of pins are used to input high-speed data signals, three pairs of pins are used to input control signals, and a maximum rate at which an MIPI signal is input is Vin−max=1.2 Gb/s per Lane. Pins on the right side is Tx, which correspond to 2-Ports output, and therefore a maximum rate at which an MIPI signal is output is Vout−max=1.5 Gb/s per Lane. Therefore, the ASSP device may input three MIPI DSI signals at the same time. It should be illustrated that various configurations which may be supported by the ASSP device are shown in FIG. 2. For example, a programmable IO may be used as an input port (Rx) or an output port (Tx). When the programmable IO is used as a Rx, input signal formats supported comprise D-PHY, SubLVDS, LVDS, SLVS200 and CMOS, and when the programmable IO is used as a Tx, output signal formats supported comprise LVDS and CMOS. Bold portions in FIG. 2 are configurations selected when the ASSP device is used as the signal processing circuit 110 according to the embodiment of the present disclosure. For example, when the programmable IO is used as a Rx, the input signal format is D-PHY, the transmission rate=1.2 Gb/s per Lane, the programmable IO on the upper side is in a form of 7 pairs of IOs, and the programmable IO on the lower side is in a form of 8 pairs of IOs; and the MIPI D-PHY on the right side is used as an output (Tx) with an output rate of 6 Gb/s. However, the present disclosure is not limited thereto.

Figure 3:
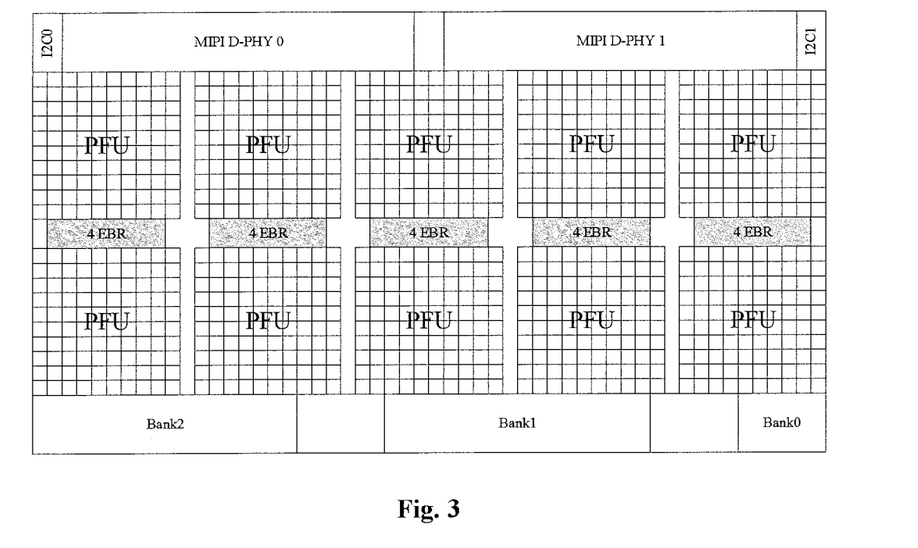
FIG. 3 is an exemplary layout distribution diagram of an ASSP device implementing a switching circuit according to an embodiment of the present disclosure.

FIG. 3 is an exemplary layout distribution diagram of an ASSP device implementing a switching circuit according to an embodiment of the present disclosure. The ASSP device comprises 5936 four input lookup tables (LUT4s) corresponding to 10 Programmable Functional Units (PFUs for short) (blocks in a PFU in FIG. 3 schematically represent multiple LUT4s, but a number of the blocks in the figure does not represent a number of the LUT4s), so as to implement functions such as logic, arithmetic, Random-Access Memory (RAM for short) and Read-Only Memory (ROM for short) etc. A row of sys MEM™ Embedded Block RAMs (EBRs) is interspersed between the PFUs, which are surrounded by programmable IO Banks (for example, Bank0, Bank1, and Bank2 in FIG. 3). The Bank here is grouping of IOs at an input terminal (Rx) of the ASSP device. Various banks have the same configuration, including Embedded Inter-Integrated Circuits (I2C for short) (for example, I2C0 and I2C1 in FIG. 3) and Embedded MIPI D-PHYs (for example, MIPI D-PHY 0 and MIPI D-PHY 1 in FIG. 3). A blank area in FIG. 3 has other functional circuits of the ASSP device, which will not be described in detail here.

Figure 4:
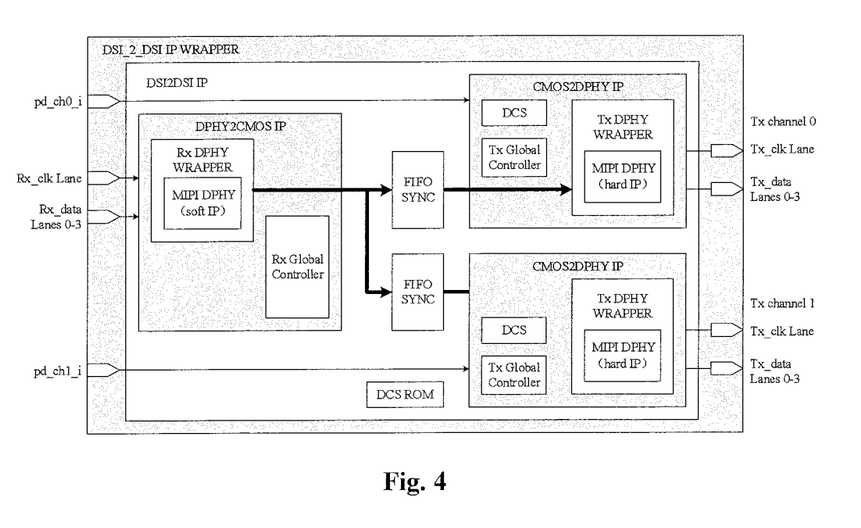
FIG. 4 is an exemplary software top-level architectural diagram of an ASSP device implementing a switching circuit according to an embodiment of the present disclosure.

The exemplary layout of the ASSP device shown in FIG. 3 provides support for software implementation in the switching circuit 110. As shown in FIG. 4, illustrated is an exemplary software top-level architectural diagram of an ASSP device implementing a switching circuit according to an embodiment of the present disclosure. In the switching circuit 110 implemented by the ASSP device, step-by-step invoking of a program is realized in a form of an Intellectual Property Core (IP core for short) in terms of software. In a first aspect, at an input terminal, a dphy2cmos.v file is constructed to form a DPHY2CMOS IP core, which is used to instantiate soft MIPI D-PHY Rx IP WRAPPER, convert serial data of D-PHY data Lanes into 32-bit (gear 8) or 64-bit (gear 16) words and transmit the words in parallel. The DPHY2CMOS IP core is further used to instantiate a Rx global controller including Finite State Machines (FSMs for short) to detect state transition of Rx clocks and the data Lanes. In a second aspect, a First Input First Output (FIFO for short) Synchronization (sync for short) (i.e., fifo_sync.v) file is constructed to form FIFO SYNCs, which are used to instantiate two 32-word FIFOs, Rx data arrives at a Tx clock domain through the FIFO SYNCs, and one FIFO corresponds to one Tx channel. It should be illustrated that the FIFO is introduced to meet a requirement that byte clocks of Rx and Tx in the MIPI D-PHY protocol must be consistent, and therefore the two FIFO SYNCs are only used for clock synchronization instead of data buffering. In a third aspect, at an output terminal, a cmos2dphy.v file is constructed to form CMOS2DPHY IP cores, which are used to instantiate hard MIPI D-PHY Tx WRAPPER of a built-in Phase Locked Loop (PLL for short), and invoke a Tx global controller to detect state conversion of Tx clocks and the data Lanes while realizing a parallel-to-serial conversion operation of data. In addition, the cmos2dphy.v file further comprises display command setting, but parameters of a Display Command Set (DCS for short) in a DSI slave mode are corrected through a dcs_rom.v file. All of the above files are constructed to form a DSI2DSI IP core, which integrally forms DSI_2_DSI IP WRAPPER together with the input terminal and the output terminal. In FIG. 4, an MIPI DSI signal input to the DPHY2CMOS IP core is one pair of clock signals (Rx_clk Lane) and four pairs of data signals (Rx_data Lanes 0-3), and control signals (pd_ch0_i and pd_ch1_i) are directly input to the CMOS2DPHY IP cores for control operation. The two CMOS2DPHY IP cores in FIG. 4 correspond to their respective output channels (i.e., Tx channel 0 and Tx channel 1), and an MIPI DSI signal output from each of the output channels also comprise one pair of clk Lanes and four pairs of data signals (Tx_data Lanes 0-3). Each of the IP cores in FIG. 4 implements functions of the two MIPI D-PHYs in FIG. 2.

It should be illustrated that the software top-level architecture of the ASSP device shown in FIG. 4 is an IP core overlay invoking architecture. In the software implementation according to the embodiment of the present disclosure, four ".v" files are used to implement IP core instantiation and hierarchical invoking, and complete transmission of the three major signals, i.e., clock signals, control signals and data signals, and bottom-level files are in a closed state to avoid the occurrence of mis-operation. In addition, by modifying only the top-level files, most of the parameters in the virtual reality device 10 can be modified, which reduces the compiling time, and makes it easy to upgrade the product.

The VR devices in the related art are usually all-in-one machines realized by AP input or split machines realized by PC input. In the background of switching between two modes, i.e., an all-in-one mode and a split mode, all-in-one split machines become a development trend of the VR devices. When a VR all-in-one split machine is constructed, a display device which conforms to the MIPI DSI interface protocol is usually used at an output terminal, but signal switching cannot be realized for a high-speed MIPI DSI signal between the all-in-one mode and the split mode through direct topological wiring. Therefore, this problem becomes the difficulty of integrating an all-in-one machine and a split machine into a VR device. The virtual reality device 10 according to the embodiment of the present disclosure implements IP core instantiation and hierarchical invoking and completes functions such as signal transmission etc. by introducing switching circuits 110 having an either-or selection output function, and constructing IP core overlay invoking architecture in the switching circuits 110, thereby enabling switching of high-speed signals.

The virtual reality device according to the embodiment of the present disclosure comprises at least one switching circuit and a display circuit, wherein the switching circuit has a first input port, a second input port, and an output port, both of the input ports are configured to input a high-speed signal, and a high-speed signal output to the display circuit under the control of the switching circuit is a high-speed signal corresponding to the first input port or the second input port. The virtual reality device according to the embodiment of the present disclosure can perform transmission and switching of the high-speed signal by using a software program configured in the switching circuit, so as to construct a VR all-in-one split machine capable of switching the input high-speed signal, which solves the problem for the VR device in the related art that it difficult to integrate an all-in-one machine and a split machine into one device since signal switching cannot be realized for a high-speed MIPI DSI signal through direct topological wiring.

Further, as the software program may be configured in the switching circuit 110 according to the embodiment of the present disclosure, in-out variables between the top-level files and the bottom-level files may further be transmitted through the software program, for example, the parameters may be transmitted in a macro definition mode, which can automatically modify the bottom-level files while modifying the top-level files, that is, a linkage mechanism is adopted, and it is easy to operate without step-by-step modification.

Optionally, in the virtual reality device 10 shown in FIG. 1, in the embodiment of the present disclosure, the first input port 111 may be configured to receive a high-speed signal input by an AP of the virtual reality device 10; and the second input port 112 may be configured to receive a high-speed signal input by an external device. The external device is, for example, a PC.

It should be illustrated that in the embodiment of the present disclosure, a data source for inputting high-speed signals to the first input port 111 and the second input port 112 is not limited. The virtual reality device 10 shown in FIG. 1 is only an exemplary implementation. Various embodiments of the present disclosure are described by taking the first input port 111 corresponding to AP input and the second input port 112 corresponding to PC input as an example, but the present disclosure is not limited thereto.

Figure 5:
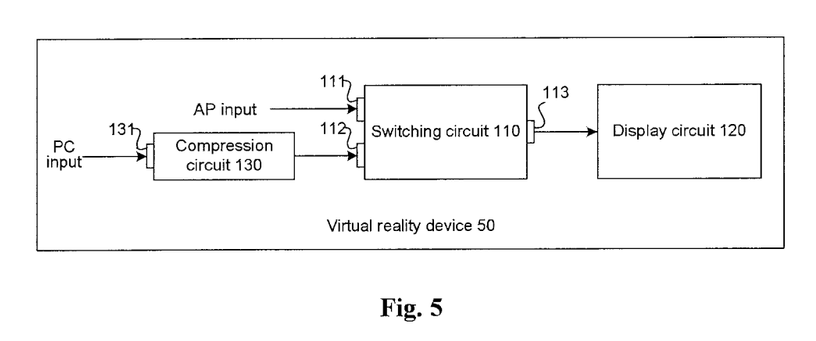
FIG. 5 is an exemplary hardware structural diagram of another virtual reality device according to an embodiment of the present disclosure.

Optionally, FIG. 5 is an exemplary hardware structural diagram of another virtual reality device 50 according to an embodiment of the present disclosure. On the basis of the structure of the virtual reality device 10 shown in FIG. 1, the virtual reality device 50 according to the embodiment of the present disclosure may further comprise: compression circuits 130 connected to the second input ports 112 of a part or all of the switching circuits 110 on a one-to-one basis.

Here, an input port 131 of each of the compression circuits 130 may be configured to receive a high-speed signal input by the external device; and a second input port 112 of each of the switching circuits may be configured to receive a high-speed signal input by the external device and compressed by a corresponding compression circuit 130.

Figure 6:
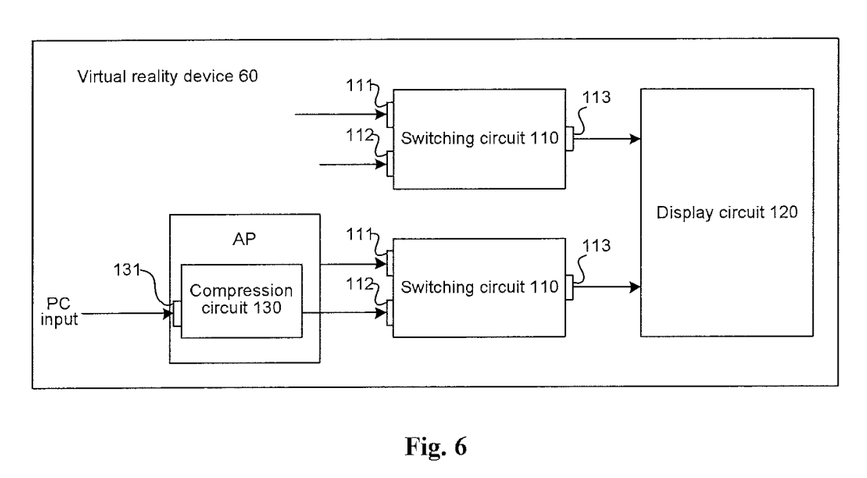
FIG. 6 is an exemplary hardware structural diagram of yet another virtual reality device according to an embodiment of the present disclosure.

It should be illustrated that the virtual reality device 50 shown in FIG. 5 is illustrated by including a switching circuit 110 as an example. At this time, all the switching circuits 110 in the virtual reality device 50 have corresponding compression circuits 130. In a possible implementation of the embodiment of the present disclosure, as shown in FIG. 6, illustrated is an exemplary hardware structural diagram of yet another virtual reality device 60 according to the embodiment of the present disclosure. The virtual reality device 60 shown in FIG. 6 may comprise two switching circuits 110, and is illustrated by taking only one switching circuit 110 including a corresponding compression circuit 130 as an example.

Optionally, in the embodiment of the present disclosure, the compression circuit 130 may be built in an AP of the virtual reality device 60, such as Exynos 8890, which has an IP core supporting DSC compression, for example, the compression circuit 130 shown in FIG. 6. The compression circuit 130 may also be separately provided outside the AP of the virtual reality device 60, for example, the compression circuit 130 shown in FIG. 5.

Figure 7:
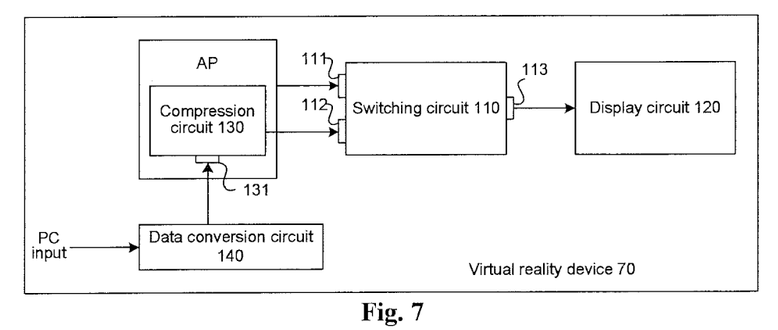
FIG. 7 is a an exemplary hardware structural diagram of still another virtual reality device according to an embodiment of the present disclosure.

Optionally, FIG. 7 is a hardware structural diagram of still another virtual reality device according to an embodiment of the present disclosure. On the basis of the virtual reality device 50 shown in FIG. 5, in the virtual reality device 70 according to the embodiment of the present disclosure, an external device (for example, a PC) may be connected to an input port 131 of the compression circuit 130 through a data conversion circuit 140.

The data conversion circuit 140 is configured to receive an HDMI signal input by the external device, convert the HDMI signal into a high-speed signal and then transmit the high-speed signal to the compression circuit 130.

In the virtual reality device 70 shown in FIG. 7, an first input port 111 corresponds to AP input, wherein an AP is described by taking an Exynos 8890 as an example. The Exynos 8890 has a built-in compression circuit 130, for example, a Display Stream Compression (DSC for short) compression algorithm circuit, which may achieve ⅓ data transmission. A second input port 112 corresponds to PC input, wherein a PC uses an HDMI interface. The data conversion circuit 140 needs to be provided to convert an HDMI signal into an MIPI DSI signal and then transmit the MIPI DSI signal to a switching circuit 110. The data conversion circuit 140 may be a bridge IC.

It should be illustrated that in the embodiment of the present disclosure, a manner in which the compression circuit is provided (for example, provided separately or built in the AP), and a specific manner in which the data is compressed are not limited. The specific manner in which the data is compressed may be the compression manner in which ⅓ data transmission is achieved, or may be other compression manners.

Optionally, the virtual reality devices 10, 50, 60, and/or 70 according to the above embodiments of the present disclosure may further comprise adaptor circuits connected to all of the first input ports 111 and all of the second input ports 112 on a one-to-one basis. The adaptor circuit may be a Flexible Printed Circuit (FPC for short). As different input devices (for example, different APs or different PCs) may have different interfaces, adaptor FPCs are provided between the input ports and the input devices, which enables the input ports of the switching circuits 110 of the virtual reality devices 10, 50, 60, and/or 70 to adapt to the interfaces of different APs or different PCs. Therefore, with respect to conditions of input through the same AP or PC, real data format and compressed data format, fluctuations in data rate etc., the virtual reality devices 10, 50, 60, and/or 70 according to the embodiments of the present disclosure can handle these conditions by only modifying the software program, i.e., modifying the software program of the IP core in the switching circuit. The embodiment shown in FIG. 1 illustrates a transmission manner of real data, and the embodiments shown in FIGS. 5 to 7 illustrate transmission manners of compressed data. With respect to input through different APs or PCs, it only needs to change the adaptor FPCs, without changing the overall device architecture, which is beneficial for saving the hardware cost, and greatly shortening the development cycle of the device.

It can be seen from the virtual reality devices 10, 50, 60 and/or 70 according to the above-described embodiments of the present disclosure, and the virtual reality devices 10, 50, 60 and/or 70 illustrated in FIGS. 1, 5 to 7, the virtual reality devices 10, 50, 60, and/or 70 according to the embodiments of the present disclosure are flexible in structure, can be configured with a plurality of transmission rates, and can transmit high-speed data signals in both a real format and a compression format.

Optionally, in the virtual reality devices 10, 50, 60, and/or 70 according to the embodiment of the present disclosure, each switching circuit 110 further comprises at least one programmable IO as an output port; and correspondingly, each switching circuit 110 is further configured to control a high-speed signal in the switching circuit 110 to be output from the programmable IO. The embodiment of the present disclosure is also illustrated by taking the switching circuit 110 being an ASSP device as an example. One to two programmable IOs are reserved on the ASSP device as outputs, wherein the programmable IO may be an idle IO in the ASSP device, or a multiplexed IO which is used to implement other functions in the ASSP device, for example, a boot IO. Software configuration may be performed on any signal in the ASSP device, and any signal in the ASSP device may be output to the programmable IO through configuration mapping, and is captured and observed by an oscilloscope, which is convenient for comparing execution effects of a product which is practically designed under different constraints such as speed, area and timing etc., and optimizing the timing while comparing simulation results to rapidly position a hardware problem, thereby greatly improving the debugging efficiency. In addition, the reserved programmable IO may also be used for subsequent expansion and upgrade of the virtual reality devices 10, 50, 60, and/or 70.

Based on the virtual reality devices 10, 50, 60, and/or 70 according to the above-described embodiments of the present disclosure, the embodiments of the present disclosure further provide a method for configuring a virtual reality device, which is used to perform software configuration on the virtual reality device 10, 50, 60, and/or 70 according to any of the embodiments of the present disclosure.

Figure 8:
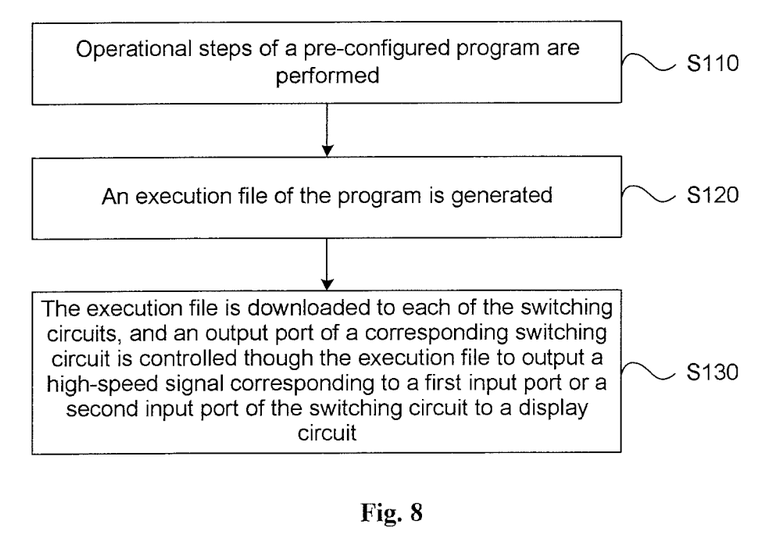
FIG. 8 is an exemplary flowchart of a method for configuring a virtual reality device according to an embodiment of the present disclosure.

As shown in FIG. 8, illustrated is a flowchart of a method for configuring a virtual reality device according to an embodiment of the present disclosure. The method according to the present embodiment is used for performing software configuration on the switching circuits 110 in the virtual reality device 10, 50, 60, and/or 70 according to any of the embodiments shown in FIG. 1 to FIG. 7, and may comprise the following steps.

In S110, operational steps of a pre-configured program are performed.

In S120, an execution file of the program is generated.

Based on the hardware structure of the virtual reality devices 10, 50, 60, and/or 70 according to the embodiments of the present disclosure, the method for configuring a virtual reality device according to the embodiment of the present disclosure specifically refers to performing software configuration on the switching circuits to implement functions such as IP instantiation, hierarchical invoking, transmission of high-speed signals, and modification of parameters etc. The virtual reality device may be, for example, a virtual reality helmet, and the display circuit of the virtual reality device is display panels of the virtual reality helmet. When a user wears the virtual reality helmet, a video which is vivid and has high authenticity may be seen by the user through left and right display panels. Generally, an input of the VR device may be input through an AP of the VR device, and at this time, the VR device is an all-in-one machine. Further, the input of the VR device may also be input through a PC, and at this time, the VR device is split machine.

In the embodiment of the present disclosure, a suitable ASSP device may be selected as the switching circuit 110, and the embodiment of the present disclosure is described by taking the ASSP device shown in FIG. 2 as an example, but the present disclosure is not limited thereto. In the either-or design solution of the high-speed signals, a program for performing operations is pre-configured. Before the software program is configured for the switching circuit 110, operational steps of the pre-configured program may be executed in device programming software, for example, including Synthesize, Translate & Map, Place & Route, etc., and an execution file of the program may be generated based on the program's design requirements.

In S130, the execution file is downloaded to each of the switching circuits, and an output port of a corresponding switching circuit is controlled though the execution file to output a high-speed signal corresponding to a first input port or a second input port of the switching circuit to a display circuit.

In the embodiment of the present disclosure, the execution file of the program is generated after the execution of the program is correct. The execution file is, for example, a ".bit" file. Then, the ".bit" file may be downloaded to the ASSP device through a programmer, so as to perform hardware verification, i.e., verifying whether the ASSP device may control an output port of a corresponding switching circuit to output a high-speed signal corresponding to a first input port or a second input port of the switching circuit to realize a function of switching high-speed data. It should be illustrated that in the embodiment of the present disclosure, the ".bit" file may be, for example, a description file of the software top-level architecture of the ASSP device shown in FIG. 4.

The VR device in the related art is usually an all-in-one machine realized by AP input or a split machine realized by PC input. In the background of switching between two modes, i.e., an all-in-one mode and a split mode, all-in-one split machines become a development trend of the VR device. When a VR all-in-one split machine is constructed, a display device which complies to the MIPI DSI interface protocol is usually used at an output terminal, but signal switching cannot be realized for a high-speed MIPI DSI signal between the all-in-one mode and the split mode through direct topological wiring. Therefore, this problem becomes the difficulty of integrating an all-in-one machine and a split machine into a VR device. In the embodiment of the present disclosure, IP core overlay invoking architecture is constructed in the switching circuit 110 by performing software configuration on the virtual reality devices 10, 50, 60, and/or 70 provided with the switching circuits 110 having an either-or output function, which implements IP core instantiation and hierarchical invoking and completes functions such as signal transmission etc., thereby enabling switching of high-speed signals.

On the basis of the hardware of the virtual reality device according to the above-described embodiments, the method for configuring a virtual reality device according to the embodiment of the present disclosure is method for performing software configuration on switching circuits of the virtual reality device, so that a high-speed signal output to the display circuit through the virtual reality device after the software configuration under the control of the switching circuit is a high-speed signal corresponding to the first input port or the second input port. The method for configuring a virtual reality device according to the embodiment of the present disclosure can enable the virtual reality device to perform transmission and switching of a high-speed signal by performing software configuration on the switching circuits and forming IP core overlay invoking architecture in the switching circuits, so as to construct a VR all-in-one split machine capable of switching the input high-speed signal, which solves the problem for the VR device in the related art that it difficult to integrate an all-in-one machine and a split machine into one device since signal switching cannot be realized for an input MIPI DSI signal.

Figure 9:
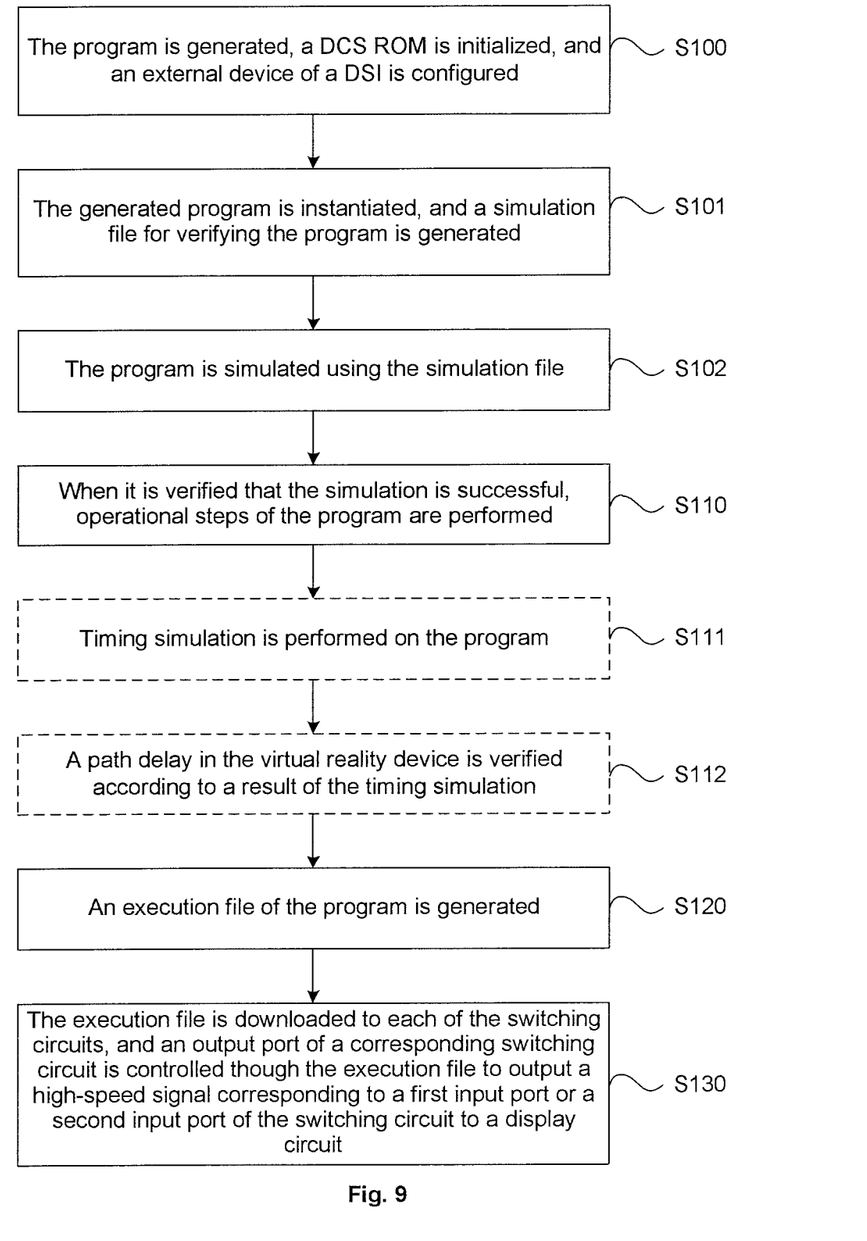
FIG. 9 is an exemplary flowchart of a method for configuring another virtual reality device according to an embodiment of the present disclosure.

FIG. 9 is a flowchart of another method for configuring a virtual reality device according to an embodiment of the present disclosure. On the basis of the embodiment shown in FIG. 8, before step S110, the method according to the embodiment of the present disclosure may further comprise the following steps.

In S100, the program is generated, a DCS ROM is initialized, and an external device of a DSI is configured. The external device of the DSI may be an input device and an output device.

In S101, the generated program is instantiated, and a simulation file for verifying the program is generated.

In practical applications of the embodiments of the present disclosure, a project may be created in the device programming software, and an ASSP device is selected to be supported. The device programming software may support the creation of the project using different description language files, for example, Verilog Hardware Description Language (HDL for short) files, Very-High-Speed Integrated Circuit Hardware (VHDL for short) files or Testbench files. The program (i.e., a DSI IP core) is generated in an IPexpress tool, a DCS ROM is initialized, and an external device of the DSI is configured. Then, the generated IP core is instantiated in top-level files of the program, and the dsi2dsi_rtl.do file is modified. The dsi2dsi_rtl.do file is in a file form in the device programming software, and a designer modifies the file according to the requirements to generate a simulation file of the above program. This simulation file is used to verify whether the generated program may meet the design requirements.

In S102, the program is simulated using the simulation file.

Correspondingly, in the embodiment of the present disclosure, S110 specifically comprises when it is verified that the simulation is successful, performing the operational steps of the program.

As described above, the purpose of generating the simulation file is to verify whether the program meets the design requirements. Therefore, it needs to simulate the program using the simulation file. In practical applications, when it is verified that the IP core is successfully instantiated through functional simulation, it indicates that the pre-configured program meets the design requirements and the entire design is executed, i.e., performing the operational steps of the program.

Optionally, before S120, the method for configuring a virtual reality device according to the embodiment of the present disclosure may further comprise the following steps.

In S111, timing simulation is performed on the program.

In S112, a path delay in the virtual reality device is verified according to a result of the timing simulation.

In the embodiment of the present disclosure, after the operational steps of the program are performed completely, post-simulation may also be performed once before the execution file (".bit" file) is generated. The simulation is specifically timing simulation, and the purpose of the simulation is primarily to verify various path delays in the virtual reality device after wirings in a layout are designed, evaluate the power consumption etc.

Optionally, in the embodiment of the present disclosure, bottom-level files of the execution file of the program downloaded to the switching circuit 110 are in a closed state, and based on this characteristics, the method according to the embodiment of the present disclosure may further comprise: modifying a part of parameter settings of the virtual reality device by modifying the top-level files of the program. By modifying the parameter settings in this way, it is beneficial for reducing the compiling time of the program, avoiding mis-operation, and making it easy to upgrade the product.

Optionally, based on the software program configured in the switching circuits 110, the method according to the embodiment of the present disclosure may further comprise: transmitting parameters between the top-level files and the bottom-level files in the program. In practical applications, in the embodiment of the present disclosure, the software design adopts a linkage mechanism, for example, the parameters between the top-level files and the bottom-level files are transmitted in a macro definition mode, that is, the bottom-level files may be modified automatically while modifying the top-level files, which is easy to operate without step-by-step modification.

Optionally, on the basis of the hardware of the virtual reality device according to the above-described embodiments in which at least one programmable IO is configured on a switching circuit as an output port, the method according to the embodiment of the present disclosure may further comprise: outputting a high-speed signal in the corresponding switching circuit from the programmable IO by modifying a mapping file of the program. In other words, any signal in the ASSP device is output to the programmable IO, and is captured and observed by an oscilloscope, which is convenient for comparing execution effects of a product which is practically designed under different constraints such as speed, area and timing etc., and optimizing the timing while comparing simulation results to rapidly position a hardware problem, thereby greatly improving the debugging efficiency. In addition, the reserved programmable IO may also be used for subsequent expansion and upgrade of the virtual reality device 10.

Referring to the method for configuring a virtual reality device according to any of the embodiments shown in FIGS. 8 and 9 and the software top-level architecture of the ASSP device shown in FIG. 4, it can be seen that the division of software parameters of the IP core overlay invoking framework is reasonable, the initialization process of the software program configuration in the switching circuit is implemented by loading and importing the DCS ROM initialization file through the IP core. The initialization is separated from the parameter configuration in a normal operation state by the DCS ROM initialization file, so that the entire initialization process is clear and apparent and the circuit IC conversion is also facilitated. In addition, the cmos2dphy.v file and the dcs_rom.v file are used to implement DCS separation between a DSI master mode and a DSI slave mode, which realize a very clear program structure.

The embodiments disclosed in the present disclosure are as described above, but the content described is merely implementations used to facilitate the understanding of the present disclosure, and is not intended to limit the present disclosure. Any modification and variation in the form and details of the implementation may be made by any skilled in the art to which the present disclosure belongs without departing from the spirit and scope of the present disclosure. The patent protection scope of the present disclosure should still be defined by the scope of the appended claims or their equivalents.

We claim:

1. A virtual reality device, comprising:
a display circuit; and
at least one switching circuit, each of the switching circuits comprising a first input port, a second input port, and an output port,
wherein the first input port and the second input port are both configured to input signals, respectively,
wherein each of the switching circuits is configured to control the output port of the switching circuit to output, to the display circuit, a signal corresponding to the first input port or the second input port of the switching circuit, and
wherein the first input port is configured to receive a signal input by an application processor of the virtual reality device; and
the second input port is configured to receive a signal input by an external device,
further comprising: compression circuits connected to the second input ports of a part or all of the switching circuits on a one-to-one basis,
wherein an input port of each of the compression circuits is configured to receive the signal input by the external device, and
wherein the second input port of each of the switching circuits is configured to receive a signal input by the external device and compressed by a corresponding compression circuit.

2. The virtual reality device according to claim 1, wherein the compression circuits are built in the application processor of the virtual reality device.

3. The virtual reality device according to claim 1, wherein the external device is connected to the input ports of the compression circuits through a data conversion circuit; and
the data conversion circuit is configured to receive a High Definition Multimedia Interface (HDMI) signal input by the external device, convert the HDMI signal into an input signal, and then transmit the input signal to the compression circuits.

4. The virtual reality device according to claim 1, wherein each of the switching circuits further comprises at least one programmable output port.

5. The virtual reality device according to claim 4, wherein each of the switching circuits is further configured to control a signal in the switching circuit to be output via a corresponding programmable output port.

6. The virtual reality device according to claim 1, further comprising:
adaptor circuits connected to all of the first input ports and all of the second input ports on a one-to-one basis.

7. The virtual reality device according to claim 1, wherein the signals are high-speed signals.

8. A method for configuring a virtual reality device, comprising:
a display circuit; and
at least one switching circuit, each of the switching circuits comprising a first input port, a second input port, and an output port,
wherein the first input port and the second input port are both configured to input signals, respectively,
wherein each of the switching circuits is configured to control the output port of the switching circuit to output, to the display circuit, a signal corresponding to the first input port or the second input port of the switching circuit, and
wherein the first input port is configured to receive a signal input by an application processor of the virtual reality device; and
the second input port is configured to receive a signal input by an external device,
further comprising: compression circuits connected to the second input ports of a part or all of the switching circuits on a one-to-one basis,
wherein an input port of each of the compression circuits is configured to receive the signal input by the external device, and
wherein the second input port of each of the switching circuits is configured to receive a signal input by the external device and compressed by a corresponding compression circuit;
the method comprising:
performing operational steps of a pre-configured program;
generating an execution file of the program; and
downloading the execution file to each of the switching circuits, and controlling, though the execution file, an output port of a corresponding switching circuit to output, to the display circuit, a signal corresponding to a first input port or a second input port of the switching circuit.

9. The method according to claim 8, wherein before generating an execution file of the program, the method further comprises:
performing a timing simulation on the program; and
verifying a path delay in the virtual reality device according to a result of the timing simulation.

10. The method according to claim 8, wherein before performing operational steps of a pre-configured program, the method further comprises: simulating the program using the simulation file; and
wherein performing operational steps of a pre-configured program comprises: when it is verified that the simulation is successful, performing the operational steps of the program.

11. The method according to claim 10, wherein before simulating the pre-configured program using the simulation file, the method further comprises:
generating the program, initializing a Display Command Set Read Only Memory (DCS ROM), and configuring an external device of a Display Serial Interface (DSI); and
instantiating the generated program, and generating the simulation file for verifying the program.

12. The method according to claim 8, wherein bottom-level files of the program are in a closed state, and the method further comprises:
modifying a part of parameter settings of the virtual reality device by modifying top-level files of the program.

13. The method according to claim 8, wherein each of the switching circuits further comprises at least one programmable output port, and the method further comprises:
outputting a signal in a corresponding switching circuit via the programmable output port by modifying a mapping file of the program.

14. The method according to claim 8, wherein the signal is a high-speed signal.

15. The method according to claim 8, wherein the signal corresponding to the first input port is a signal input by an application processor of the virtual reality device.

16. The method according to claim 8, wherein the signal corresponding to the second input port is a signal input by an external device.

17. The method according to claim 16, wherein the signal corresponding to the second input port is a signal input by the external device and compressed by a corresponding compression circuit.

18. The method according to claim 17, wherein the signal corresponding to the second input port is a signal input by the external device, converted by a data conversion circuit, and compressed by a corresponding compression circuit.

* * * * *